UNITED STATES PATENT OFFICE.

HENRY BLUMENBERG, JR., OF LOS ANGELES, CALIFORNIA, ASSIGNOR TO FRIEDA BLUMENBERG, OF NEW YORK, N. Y.

FERTILIZER AND PROCESS OF MAKING THE SAME.

1,266,199.

Specification of Letters Patent.   Patented May 14, 1918.

No Drawing.   Application filed July 16, 1917.   Serial No. 180,801.

*To all whom it may concern:*

Be it known that I, HENRY BLUMENBERG, Jr., a citizen of the United States, residing at Los Angeles, in the county of Los Angeles and State of California, have invented new and useful Improvements in Fertilizer and Processes of Making the Same, of which the following is a specification.

My invention relates to a fertilizer and a process of making the same.

It is an object of this invention to provide a fertilizer which is produced in an economical manner and which possesses physical properties which make it especially suitable in drilling machines. Sodium nitrate and gypsum are valuable fertilizers, but are objectionable for use in drilling machines because of their hygroscopic qualities. I combine the two, thereby producing a non-hygroscopic, brittle mass, which can be easily powdered and applied to the soil by means of drilling machines.

My invention consists in the new fertilizer and in the process of producing the same, as hereinafter described and claimed.

I take an insoluble phosphate or sulfate or carbonate of an alkaline earth metal, preferably pulverized, and mix the same with a nitrate of an alkali metal, such as sodium nitrate, in the proportion of one part nitrate of an alkali metal to one part alkaline earth metal, sulfate, phosphate or a combination of the same. The mixture is heated to a temperature of 300° to 350° centigrade, until the mass is fused. Care should be taken not to carry the heating beyond the point where the sodium nitrate dissociates and nitrogen oxid fumes are given off. If lime or gypsum are mixed with sodium nitrate and fused, as just described, the resulting mass besides being non-hygroscopic, has the advantage of containing the lime in a form readily available when subjected to such natural agencies as are contained in the soil—moisture, humus, carbon dioxid, and the like. These agencies effect a conversion whereby the nitrogen of the sodium nitrate combines with the lime and the gypsum, forming calcium nitrate and sodium sulfate, the former being a valuable fertilizer non-toxic to plant life. This double decomposition has many advantages over the use of sodium nitrate alone, which is eventually converted into sodium carbonate.

I find, furthermore, that when sodium nitrate is fused with natural rock phosphate (commonly called tri-calcium-phosphate) that the phosphoric acid becomes available far more readily to plant life than if the plain ground phosphate rock is used. I do not mean by this that this process will produce available phosphoric acid as quickly as phosphoric acid made by the super phosphate process, but it will produce available phosphoric acid for plant life far more readily than if the crude ground rock is used.

The solubilities of the alkaline earth, carbonates, sulfates and phosphates in the presence of the alkali metal nitrate has been known to analytical chemists for some time, but no direct fusion of this combination has been known, or that the nitrate can be brought forward or applied in this form to the soil. It can be readily seen that by fusing either calcium sulfate, tri-calcium-phosphate, or any combination thereof, that an alkali metal nitrate, as above described, eliminates all moisture from the material by the mere fact of this fusion, and, furthermore, brings the phosphoric acid into a more available form for plant life assimilation than by mixing it mechanically with the alkaline nitrate or spraying them separately on the ground.

The fusion of several hours of this mass brings about a molecular combination which apparently responds more quickly to the humus, moisture and carbon dioxid in the soil than if the crude materials were used as heretofore.

I claim:

1. A fertilizer consisting of a fused mass containing a nitrate of an alkali metal, and an insoluble salt of calcium.

2. A fertilizer consisting of a fused mass containing sodium nitrate and tri-calcium-phosphate.

3. A process of making a fertilizer, comprising heating a mixture of a salt of calcium and a nitrate of an alkali metal, until fusion takes place, and short of the point where nitrogen oxid fumes are given off.

In testimony whereof I have signed my name to this specification.

HENRY BLUMENBERG, JR.